United States Patent Office

3,635,925
Patented Jan. 18, 1972

3,635,925
POLYMERIZATION OF VINYL CHLORIDE IN BULK AND AT LOW TEMPERATURES
Sergio Lo Monaco, Vincenza, Carrado Mazzolini, Mestre-Venice, and Luigi Patron and Alberto Moretti, Venice, Italy, assignors to Chatillon Societa Anonima Italiana per le Fibre Tessili Artificiali S.p.A., Milan, Italy
No Drawing. Continuation-in-part of application Ser. No. 671,216, Sept. 28, 1967. This application Dec. 15, 1969, Ser. No. 885,293
Claims priority, application Italy, Dec. 16, 1968, 25,161/68
Int. Cl. C08f 1/62, 3/30
U.S. Cl. 260—85.5
15 Claims

ABSTRACT OF THE DISCLOSURE

Vinyl chloride is polymerized in bulk and at low temperatures utilizing a polymerization catalyst comprised of an organic hydroperoxide, sulphur dioxide and an alcoholate of a Group I metal of the Periodic Table, said alcoholate having from 1 to 6 carbon atoms, and said alcoholate and sulphur dioxide being present in a molar ratio of at least 2.

CROSS REFERENCE TO RELATED APPLICATION

This application is a continuation-in-part of our copending application Ser. No. 671,216, filed Sept. 28, 1967.

In said copending application, Ser. No. 671,216, there is disclosed and claimed a process for bulk-polymerizing vinyl chloride at low temperatures (e.g., lower than 0° C.) in the presence of a catalytic system comprised of an organic hydroperoxide, sulphur dioxide and an alcoholate of a metal of the first or second group of the Periodic Table or aluminum, and wherein the molar ratio (R—O)−/SO$_2$ (wherein R is a linear or branched chain alkyl radical having from 1 to 6 carbon atoms) does not exceed 2.

It has now been surprisingly found that especially desirable polymers, polymers which are whiter and more stable to heat, are obtained when the polymerization of vinyl chloride in bulk and at low temperature is conducted in the presence of a catalytic system comprised of an organic hydroperoxide, sulphur dioxide and at least one alcoholate of a metal of the first group of the Periodic Table, and in which the molar ratio alcoholate/SO$_2$ is at least 2.

The aforesaid phenomenon is considered truly surprising in that when one employs in the catalytic system alcoholates of a metal of the second group of the Periodic Table, in ratios of 2 or more (express as gram-equivalents per gram-molecule of SO$_2$), there is induced the inhibition of the low-temperature bulk polymerization of vinyl chloride, while, contrariwise, in the case of an alcoholate of a metal of the first group of the Periodic Table, ratios of at least 2 not only do not adversely affect the polymerization speed, which in any event remains quite high, but also considerably improves the physio-chemical properties, and especially color and heat stability, of the polyvinyl chloride.

It has furthermore been experimentally ascertained that upon increasing the concentration of the alcoholate of a metal of the first group of the Periodic Table, commencing with quantities of two moles of alcoholate per mole of SO$_2$, the physio-chemical properties of the polymer improve markedly, especially insofar as whiteness and heat stability are concerned, while the speed of polymerization does not suffer any appreciable variation.

In the following Table I there are recorded: conversion, intrinsic viscosity, color and heat stability of the polyvinyl chloride obtained via the continuous bulk-polymerization, at −30° C., of vinyl chloride according to the process of this invention, by employing various molar ratios of sodium methylate/SO$_2$.

The original color is expressed as purity index (PI) and as brightness (B), while the heat stability is expressed as speed of dehydrochlorination at 180° C. ($\Delta$HCl), in millimoles of HCl/g. hr., and as variation in the purity index ($\Delta$PI) and in the brightness ($\Delta$B) when heating the polymer at 110° C. for 1 hour in a forced air oven.

The polymerization conditions were the following:

(1) Concentration of cumene hydroperoxide: 0.1% by weight with respect to the vinyl chloride;
(2) Molar ratio SO$_2$/cumene hydroperoxide: 2; and
(3) Contact time of reactants with each other: 90 minutes.

The sodium methylate was fed by means of two methanol solutions, one of which consisting of SO$_2$ and an equimolar amount of sodium methylate (with respect to the SO$_2$), and the other containing the remaining methylate.

TABLE I

| Molar ratio sodium methylate to SO$_2$ | Conversion | Intrinsic viscosity in dl./g. | Original color PI | B | Heat stability $\Delta$ PI | $\Delta$ B | $\Delta$ HCl |
|---|---|---|---|---|---|---|---|
| 1 | 9.0 | 1.32 | 99.2 | 94.5 | 2.0 | 10.1 | 0.08 |
| 1.5 | 9.8 | 1.35 | 99.3 | 94.7 | 1.9 | 9.8 | 0.065 |
| 2 | 10.1 | 1.36 | 99.5 | 95.0 | 1.5 | 8.2 | 0.048 |
| 3 | 11 | 1.31 | 99.4 | 95.2 | 1.5 | 7.9 | 0.030 |
| 5 | 11 | 1.32 | 99.5 | 95.3 | 1.6 | 7.6 | 0.038 |
| 7 | 11.1 | 1.35 | 99.6 | 95.2 | 1.7 | 7.4 | 0.038 |

As is apparent from the above table, the color and heat stability of the polyvinyl chloride increase upon increasing the molar ratio alcoholate/SO$_2$ and become particularly advantageous for shaping fibers when this molar ratio is at least 2. As can also be seen from said Table I, with values of the molar ratio alcoholate/SO$_2$ of greater than 5, no further appreciable improvement in the physico-chemical properties of the polymer are reflected, while, on the other hand, there occur problems in the purification of the polymer. For this reason, in practice it is preferred to employ such quantities of alcoholates that will result in a molar ratio of alcoholate/SO$_2$ not exceeding 5.

Amongst the alcoholates of the metals of the first group of the Periodic Table, those which have a number of carbon atoms comprised between 1 and 3 are the preferred for solubility reasons. The alcoholates obtained through the direct reaction of alcohol with metal, are especially preferred for reasons of economy and ease of preparation, and of these sodium or potassium methylate or ethylate are the most preferred.

The alcoholates may be added to the reaction mass either as such or, better still, dissolved in a non-reactive organic solvent. The optimum solvents for alcoholates are aliphatic alcohols having from 1 to 5 carbon atoms, and, of these, methyl and ethyl alcohol are the preferred.

Practically, it is advantageous to feed the amount of alcoholate contemplated by means of two separate alcoholic solutions, one of which contains the quantity of SO$_2$ contemplated and an equimolar quantity of alcoholate, and the other contains the remaining alcoholate.

The organic solvents are most preferably anhydrous in order to avoid hydrolysis of the alcoholates.

As reflected in our copending application Ser. No. 671,216, by organic hydroperoxide there are intended those organic compounds of the general formula: R—O—O—H, wherein "R" may be a linear or branched alkyl radical, a cycloalkyl radical, an aryl- or an aryl-alkyl radical.

Of the compounds falling within the above general formula R—O—O—H, in practice there are preferred cumene hydroperoxide and tert.butyl-hydroperoxide.

The concentration of the organic hydroperoxide is not critical and in general may vary between 0.01 and 3% by weight with respect to the monomers, but concentrations of hydroperoxide not exceeding 0.4% are preferred.

The organic hydroperoxide may be fed to the reaction mass either as such or in solution in a suitable solvent such as the alcohols methyl, ethyl, and propyl alcohol, etc.

The concentration of the sulphur dioxide is also not critical, but in practice it is preferred to maintain same below 3% by weight with respect to the monomers.

Concentrations of sulphur dioxide higher than 3% may also be used, but same are not advisable in practice as they do not involve any appreciable increase in the polymerization speed but only cause a greater consumption.

In practice, the concentration of sulphur dioxide is preferably comprised between 0.01% and 2% by weight, and the molar ratio sulphur dioxide/organic hydroperoxide is comprised between 1:15 and 15:1, but preferably between 0.5:1 and 10:1.

This invention relates to a process for the low-temperature bulk polymerization of vinyl chloride. By "low-temperature" there is intended a temperature below 0° C., and, more particularly, a temperature comprised between —10° C. and —70° C. The temperature of the reaction mixture is controlled through conventional means such as, for instance, by keeping the reactor in a cryostatic bath or by permitting a refrigerated fluid to circulate around the reactor walls or by providing cooling coils within the reactor.

By "bulk polymerization" as used herein there is intended not only the polymerization carried out by the catalytic system in the undiluted monomer, but also that polymerization which is carried out in the presence of minor quantities of non-reactive organic compounds, which compounds are liquid at polymerization temperatures and which exert a fluidizing action on the polymerization slurry to render the same more stirrable and to facilitate heat exchange throughout the reaction or polymerization vessel.

As fluidizing reactants the following substances may be used: aliphatic hydrocarbons, aryl-hydrocarbons, cycloalkyl-hydrocarbons, saturated halogenated hydrocarbons, and the like.

To the polymerization mass there may be added in small quantities, for instance from 50 to 1000 p.p.m. with respect to the monomer, of alkyl-mercaptans in order to regulate or control the molecular weight of the polymer.

It has been noticed that the alkyl-mercaptans, besides functioning as chain-regulators, also serve to fluidize the polymerization slurry. Of the alkyl-mercaptans intended, those having from 1 to 15 carbon atoms are preferred, but those having from 4 to 8 carbon atoms afford the best results.

It is moreover advisable to carry out the polymerization in the absence of oxygen which has an inhibiting effect on the polymerization. In general, for this purpose, suitable inert gases, such as nitrogen, are used, to displace the air from the polymerization reactor.

The bulk polymerization may be carried out, in practice, either in a continuous or in a semi-continuous or in a batchwise mode of operation.

The bulk polymerization may be short-stopped at the desired level, that is, at the desired degree of monomer conversion and at the desired molecular weight, by treating the reaction slurry with an aqueous or alcoholic solution of a hydroxylamine sulfate. In the case of a continuous polymerization system, the solution of the hydroxylamine salt may be added either to the overflow tube at the outlet of the reactor or in a successive tank containing water heated to 50° C., in which there is carried out at the same time the inhibition and separation by evaporation of the unreacted monomer from the polymer.

It is to be understood that catalytic systems employed in the process of the present invention may be applied with advantage also in the preparation of vinyl chloride polymers containing up to 50% by weight of at least one other ethylenically unsaturated monomer copolymerizable with vinyl chloride. The only difference with respect to the above described process is that the starting monomers are a mixture of vinyl chloride and one or more copolymerizable ethylenically unsaturated monomers.

By "ethylenically unsaturated monomers" there are intended organic compounds containing the C=C group. Examples of these compounds are: vinyl or vinylidene compounds, such as vinylidene fluoride or chloride; vinyl fluoride; vinyl esters of aliphatic carboxylic acids containing from 2 to 18 carbon atoms, such as, for instance, the vinyl esters of acetic acid, of propionic acid, etc.; monomers of the acrylic type such as acrylic acid, methacrylic acid and their derivatives, such as acrylonitrile, acrylates and methacrylates of aliphatic alcohols containing from 1 to 12 carbon atoms, and the like.

In order to further illustrate the present invention and the advantages thereof, the following specific examples are given, it being understood that they are intended merely as illustrative and in no wise limitative.

EXAMPLE 1

Into a 2-litre glass polymerization reactor, provided with a stirrer, a cooling system and a thermometer, there were continuously fed:

vinyl chloride;
an organic hydroperoxide;
a methanolic solution containing the intended amount of sulphur dioxide and an equimolar quantity of an alcoholate of a metal of the first group of the Periodic Table;
a methanolic solution containing the remaining amount of alcoholate.

The polymerization reactor was maintained at —30° C. by means of a thermostatically controlled bath. From an overflow tube the polymer suspension thus obtained was discharged into an aqueous solution at 50° C. of hydroxylamine hydrochloride maintained at a pH of about 6 by the addition of sodium bicarbonate. The polymer was then separated by centrifugation and was then washed with methanol and with ethyl ether and finally dried.

In Table II the following data are recorded:

(1) Feeding rate of the vinyl chloride, in g./hr.
(2) Feeding rate of the organic hydroperoxide, in g./hr.
(3) Feeding rate of the sulphur dioxide, in g./hr.
(4) Type and feeding rate of the alcoholate, in g./hr.
(5) Intrinsic viscosity ($\eta$) of the resultant polymer, determined in cyclohexanone at 30° C. and expressed in dl./g.
(6) Conversion expressed in percent with respect to the monomers.
(7) Original color of the polymer, determined by means of a General Electric Integrating Spectrophotometer according to the C.I.E.-system of representation and measurement of color. According to this system the color is expressed in terms of purity index (PI) and brightness (B) referred to a standard illumination.
(8) Thermal stability or sensitivity expressed by the variation in purity index ($\Delta$PI) and by the variation in brightness ($\Delta$B) of the polymer after heating in a forced-air oven for 1 hour at 110° C.
(9) Syndiotacticity index (SI) determined on the basis of the ratio between the absorptions of the infrared bands D635 cm.$^{-1}$ and D693 cm.$^{-1}$, as described by Fordham, Burleigh and Sturn, Journal of Polymer Science, vol. XLI, pages 73–82 (1959).

(10) The dehydrochlorination ($\Delta$HCl) at 180° C., determined according to: W. C. Geddes, Europ. Polymer J., 3 267 (1967), and expressed in millimoles of HCl/ g./hr.

TABLE II

| Vinyl chloride in g./hr. | Organic hydroperoxide Type | Organic hydroperoxide G./hr. | SO$_2$ in g./hr. | Alcoholate Type | Alcoholate Fed in methanolic solution with SO$_2$ in g./hr. | Alcoholate Fed in methanolic solution in g./hr. | Molar ratio alcoholate/SO$_2$ | Intrinsic viscosity ($\eta$) | Conversion in percent | Original color PI | Original color B | Thermal sensitivity $\Delta$ PI | Thermal sensitivity $\Delta$ B | IS | HCl |
|---|---|---|---|---|---|---|---|---|---|---|---|---|---|---|---|
| 1,000 | Cumene hydroperoxide. | 0.5 | 0.42 | CH$_3$—O—Na | 0.35 | 0.35 | 2 | 1.64 | 8.9 | 99.5 | 95.4 | 1.8 | 7.8 | 2.15 | 0.04 |
| 1,330 | do | 1.33 | 1.12 | CH$_3$—O—Na | 0.95 | 1.42 | 2.5 | 1.31 | 11 | 99.4 | 95.3 | 1.5 | 7.6 | 2.10 | 0.038 |
| 1,000 | Tert-butyl-hydroperoxide. | 0.3 | 0.84 | CH$_3$—CH$^2$—O—Na | 0.9 | 1.8 | 3 | 1.45 | 10.8 | 99.3 | 95.6 | 1.5 | 7.5 | 2.15 | 0.035 |
| 1,000 | do | 0.3 | 0.84 | CH$_3$—O—K | 0.93 | 1.87 | 3 | 1.35 | 11.5 | 99.6 | 95.2 | 1.7 | 7.9 | 2.15 | 0.039 |

What is claimed is:

1. In a process for the low-temperature bulk polymerization of vinyl chloride at a temperature below 0° C. and down to about −70° C. utilizing a polymerization catalyst comprised of (a) an organic hydroperoxide, (b) sulphur dioxide at a sulphur dioxide/organic hydroperoxide molar ratio ranging between about 1:15 and 15:1, and (c) an alcoholate of a Group I metal of the Periodic Table, said alcoholate having from 1 to 6 carbon atoms, the improvement which comprises employing the said alcoholate and the said sulphur dioxide in a molar ratio of at least two.

2. The process as defined by claim 1, wherein the alcoholate has from 1 to 3 carbon atoms.

3. The process as defined by claim 2, wherein the molar ratio of alcoholate to sulphur dioxide does not exceed 5.

4. The process as defined by claim 3, wherein the alcoholate is selected from the group consisting of sodium methylate and sodium ethylate.

5. A process as defined by claim 3, wherein the alcoholate is selected from the group consisting of potassium methylate and potassium ethylate.

6. The process as defined by claim 3, wherein the alcoholate is introduced to the reaction mass as a solution in an aliphatic alcohol having from 1 to 5 carbon atoms.

7. The process as defined by claim 3, wherein the alcoholate is introduced to the reaction mass as two separate solutions in an aliphatic alcohol having from 1 to 5 carbon atoms, the first containing the amount of sulphur dioxide intended and an equimolar amount of alcoholate, and the second containing the remaining alcoholate.

8. The process as defined by claim 3, wherein the concentration of the organic hydroperoxide ranges from between about 0.01 and 3% by weight based on weight monomer.

9. The process as defined by claim 3, wherein the concentration of the sulphur dioxide does not exceed 3% by weight based on weight monomer.

10. The process as defined by claim 3, wherein the vinyl chloride is copolymerized with up to 50% of at least one other ethylenically unsaturated monomer copolymerizable therewith.

11. The process as defined by claim 3, wherein the reaction is carried out in the presence of an alkyl-mercaptan having from 1 to 15 carbon atoms.

12. The process as defined by claim 8, wherein the concentration of the organic hydroperoxide does not exceed 0.4% by weight based on weight monomer.

13. The process as defined by claim 9, wherein the concentration of the sulphur dioxide ranges from between about 0.01 and 2% by weight based on weight monomer.

14. The process as defined by claim 3, wherein the molar ratio of sulphur dioxide to organic hydroperoxide ranges from between about 0.5:1 and 10:1.

15. The process as defined by claim 6, wherein the aliphatic alcohol solvent is selected from the group consisting of methyl alcohol and ethyl alcohol.

References Cited

UNITED STATES PATENTS 3,255,164   3/1966   Visger et al. _____ 260—86.3
3,415,797   12/1968  Borsini et al. _____ 260—92.8
3,476,727   11/1969  Lo Monaco et al. ____ 260—92.8

JOSEPH L. SCHOFER, Primary Examiner

J. A. DONAHUE, JR., Assistant Examiner

U.S. Cl. X.R.

260—86.3, 87.1, 87.5 A, 87.7, 92.8